(12) United States Patent
Chung et al.

(10) Patent No.: US 7,664,512 B2
(45) Date of Patent: Feb. 16, 2010

(54) DATALINK THROUGHPUT REDUCTION VIA ENERGY DETECTION

(75) Inventors: Hyo K Chung, Greenville, TX (US); Phuong H Le, Plano, TX (US); John M Parker, Sachse, TX (US); David L Reid, Richardson, TX (US); Mark A Robertson, Greenville, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 372 days.

(21) Appl. No.: 11/463,804

(22) Filed: Aug. 10, 2006

(65) Prior Publication Data

US 2008/0039039 A1  Feb. 14, 2008

(51) Int. Cl.
*H04W 24/00* (2009.01)

(52) U.S. Cl. .................. 455/456.1; 455/12.1; 375/350; 342/357.01; 342/357.09

(58) Field of Classification Search .................. 455/456; 375/350
See application file for complete search history.

(56) References Cited

U.S. PATENT DOCUMENTS

| | | | | |
|---|---|---|---|---|
| 5,422,913 A * | 6/1995 | Wilkinson | ................... | 375/347 |
| 5,499,252 A | 3/1996 | Watanabe | | |
| 5,677,837 A * | 10/1997 | Reynolds | .................. | 455/456.3 |
| 6,163,297 A * | 12/2000 | Rose | ........................... | 342/418 |
| 6,556,942 B1 * | 4/2003 | Smith | ......................... | 702/150 |
| 6,577,265 B2 * | 6/2003 | Dalton et al. | ............. | 342/26 R |
| 6,834,073 B1 | 12/2004 | Miller et al. | | |
| 6,904,538 B2 | 6/2005 | Glas et al. | | |
| 6,928,104 B2 | 8/2005 | Pan et al. | | |
| 2001/0046870 A1 * | 11/2001 | Stilp et al. | ................... | 455/456 |
| 2001/0056331 A1 * | 12/2001 | Lu et al. | ........................ | 702/69 |
| 2002/0051085 A1 * | 5/2002 | Lee | ........................... | 348/570 |
| 2002/0136288 A1 * | 9/2002 | McCarty, Jr. | ................. | 375/232 |
| 2002/0156556 A1 * | 10/2002 | Ruffner | ........................ | 701/23 |
| 2003/0016174 A1 * | 1/2003 | Anderson | .................... | 342/378 |
| 2003/0072360 A1 * | 4/2003 | Liang et al. | ................. | 375/222 |
| 2004/0166801 A1 * | 8/2004 | Sharon et al. | .............. | 455/12.1 |
| 2005/0124333 A1 * | 6/2005 | Van Den Bogaert et al. | | 455/420 |

* cited by examiner

*Primary Examiner*—Nick Corsaro
*Assistant Examiner*—Chuong A Ngo
(74) *Attorney, Agent, or Firm*—Hovey Williams LLP (57) ABSTRACT

A geolocation system (10) includes an emitter (12), a plurality of collection nodes (14,16,18), and a control station (20). Each collection node includes a receiver (24) that is operable to receive signals transmitted from the emitter (12), generate a reduced data stream that includes only signal data, and communicate the reduced data stream to the control station (20) along with navigation data. The receiver (24) identifies signal data by detecting an energy level of the raw collection data. More specifically, the receiver (24) determines a bandwidth and a signal-to-noise ratio of each portion of the collection data, and identifies each portion as including signal data if both the bandwidth and the signal-to-noise ratio exceed predetermined threshold amounts. The receiver (24) includes a digital signal processing component (36) for performing calculations used by the receiver (24) to determine the bandwidth and the signal-to-noise ratio.

21 Claims, 5 Drawing Sheets

DATALINK THROUGHPUT REDUCTION VIA ENERGY DETECTION

BACKGROUND OF THE INVENTION

1. Field of the Invention

Embodiments of the present invention relate to the field of systems and methods for reducing data throughput over wireless data links. More particularly, embodiments of the present invention reduce data throughput over wireless data links by distinguishing signal data from non-signal data and communicating only the signal data over a wireless data link while preserving signal timing information.

2. Description of Prior Art

Geolocation systems commonly include a plurality of data collection nodes that receive a wireless signal from an emitter and use differences in the signal received at each node, such as differences in a time of arrival or a frequency, to determine a location of the emitter. In order to use the signals received at each node to determine the location of the emitter, however, the signals need to be compared and, thus, communicated to a central location for analysis.

Communicating the collected signals to a central location adds a substantial amount of time to the geolocation process because each of the multiple collection nodes must communicate signal collection data to the central location via a data link with limited bandwidth. If a collection period is one minute, for example, it may take one minute or more for each node to communicate the collected signals to the central location for processing. Thus, signal analysis and determination of the emitter location are substantially delayed.

One method of reducing the time required to communicate signal collection data from each node to the central location involves compressing the signal collection data before transmission, thus reducing the total amount of data communicated via the data link. Unfortunately, data compression is only marginally effective in solving the problem. While data compression reduces the amount of data communicated via the data link, even the reduced amount of data requires a significant amount of time to transfer. Furthermore, increased data compression typically results in greater loss of the compressed data, possibly compromising the accuracy of the geolocation system.

Accordingly, there is a need for an improved geolocation system that does not suffer from the problems and limitations of the prior art.

SUMMARY OF THE INVENTION

Embodiments of the present invention provide an improved system and method for reducing data throughput over wireless data links. Particularly, embodiments of the present invention reduce data throughput over a wireless data link by distinguishing signal data from non-signal data and communicating only the signal data over the wireless data link while preserving signal timing information to be used, for example, in geolocation applications.

A first embodiment of the invention is a receiver with reduced data link throughput. The receiver comprises a first interface for receiving a wireless signal and for generating signal collection data, wherein the signal collection data includes signal data and non-signal data; a processor for analyzing the signal collection data to identify portions of the data that include signal data and portions of the data that include only non-signal data; a second interface for communicating information to an external device via a wireless data link; and a controller for communicating only the portions of the data that include signal data to the second interface for communication to the external device via the wireless data link.

A second embodiment of the invention is a geolocation system with reduced data link throughput. The system comprises a transmitter for transmitting a wireless signal and a plurality of mobile receiver platforms. Each platform includes a circuit for receiving the wireless signal and for generating collection data, wherein the collection data includes signal data and non-signal data and is divided into time blocks of uniform size. Each platform further includes a circuit for generating navigation data indicating a position and a velocity of the platform corresponding to the collection data, a digital signal processor for determining whether each data block includes signal data by determining a signal to noise ratio and a bandwidth of each stored data block and comparing the signal to noise ratio and the bandwidth to pre-determined threshold values, and a wireless data link interface. A controller associated with each platform communicates the collection data to the digital signal processor and communicates qualified data and corresponding navigation data to the data link interface, wherein qualified data includes only data blocks that contain signal data.

The geolocation system further comprises a control station for receiving the data packets communicated by each of the receiver platforms and generating location information of the transmitter based on the data packets.

A third embodiment of the invention is a method of data collection that reduces throughput of a data link between a receiver and a control station. The method comprises receiving a wireless signal and generating signal collection data at the receiver, wherein the signal collection data includes signal data and non-signal data and is divided into data blocks; analyzing each data block at the receiver to determine whether the data block includes signal data; and communicating qualified data from the receiver to the control station via a wireless data link, wherein the qualified data includes only data blocks that include signal data.

These and other important aspects of the present invention are described more fully in the detailed description below.

BRIEF DESCRIPTION OF THE DRAWINGS

Embodiments of the present invention are described in detail below with reference to the attached drawing figures, wherein.

DETAILED DESCRIPTION

Figure 1:
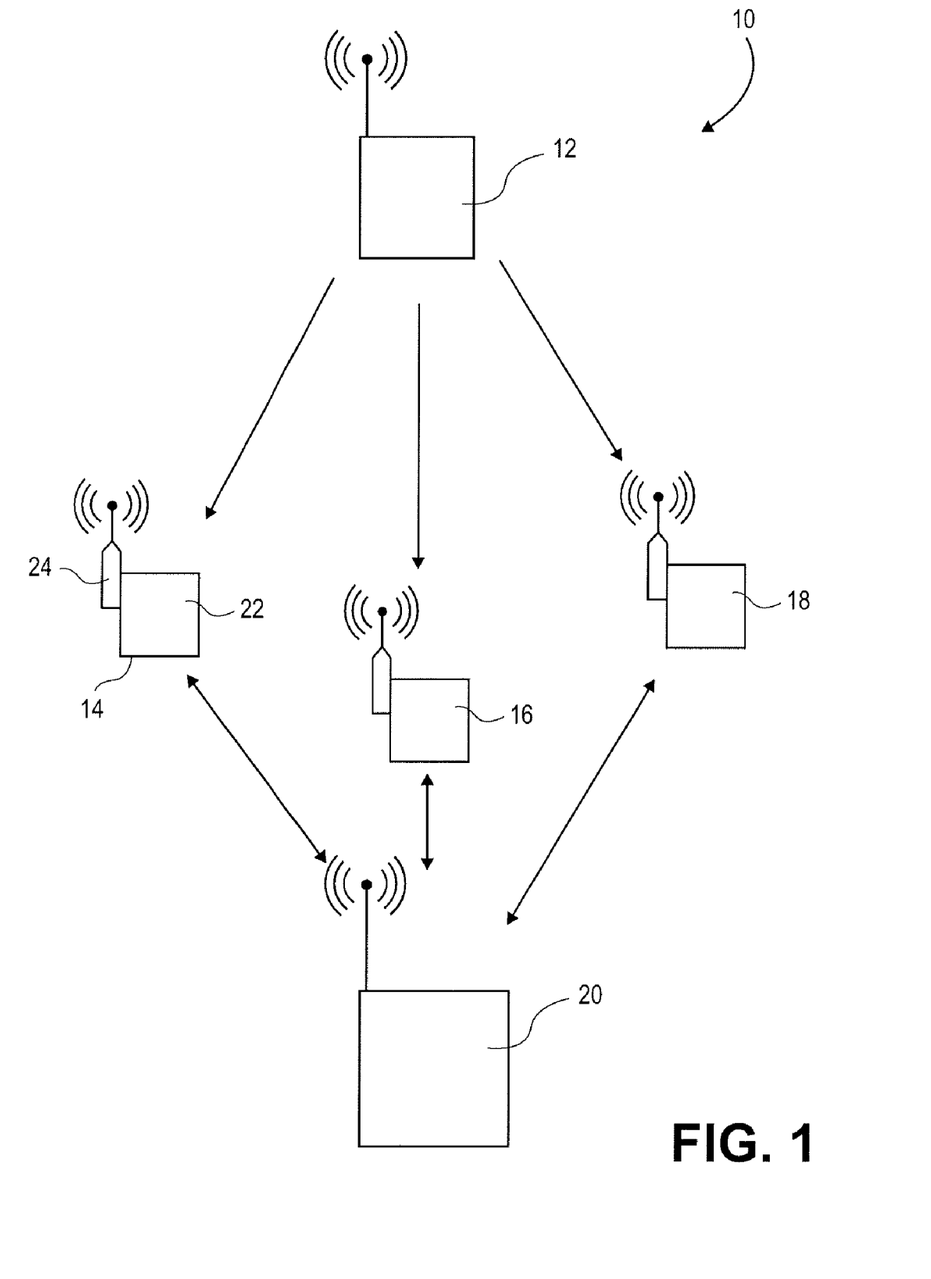
FIG. 1 is a block diagram of an exemplary geolocation system with reduced data link throughput incorporating principals of the present invention, wherein the system comprises an emitter, a plurality of collection nodes, and a control station.

An exemplary geolocation system incorporating principles of the present teachings is illustrated in FIG. 1 and designated generally by reference numeral 10. The system 10 broadly comprises an emitter 12, a plurality of collection nodes 14,16, 18, and a control station 20.

The emitter 12 is similar to conventional or known emitters and transmits a wireless signal that is used by the collection nodes 14,16,18 and the control station 20 to determine a location, velocity, or both of the emitter 12. The emitter 12 is associated with a vehicle, person, or other object (not shown) whose position is tracked by the system 10, wherein the emitter 12 may be integrally or removably attached to the object. The emitter 12, for example, may be associated with a law enforcement officer, a soldier, a police or military vehicle such as a car, ship, or airplane, or a radar station. Thus, during operation, the emitter 12 may be stationary or mobile.

The collection nodes 14,16,18 are virtually identical in nature, therefore only node 14 will be described in detail herein with the understanding that the description of node 14 applies to nodes 16,18. The collection node 14 includes a platform 22 and a receiver 24. The receiver 24 is supported on or carried by the platform 22, wherein the platform 22 may be stationary or mobile. In one embodiment, the platform 22 is a land, air, or sea-borne vehicle, and may be manned or unmanned. In operation, the nodes 14,16,18 are spaced in a conventional manner such that the wireless signal transmitted by the emitter 12 can be used by the nodes 14,16,18 and the control station 20 to determine a location of the emitter 12, as explained below in greater detail.

While the system 10 has been described and illustrated with three collection nodes 14,16,18, those skilled in the art will recognize that the system 10 may include another number of collection nodes, such as, for example, four, five, six, or more nodes. Each of the nodes 14,16,18 may be similar to known or conventional receivers except that the receivers 14,16,18 are operable to generate a reduced data stream of collection data, as explained below in greater detail.

The control station 20 directs operation of the collection nodes 14,16,18 by communicating task information to each of the nodes 14,16,18. The station 20 further receives emitter signal information and navigation data from each of the nodes 14,16,18, and determines a location of the emitter 12 using the emitter signal information and navigation data received from the nodes 14,16,18. The control station 20 uses, for example, a cross ambiguity function (CAF) to estimate a time difference of arrival (TDOA) and a frequency difference of arrival (FDOA) of the signals received by the nodes 14,16,18. The control station may be similar to conventional or known geolocation system controllers, except that the control station 20 is operable to process reduced data streams generated by the nodes 14,16,18, as explained below in greater detail.

Figure 2:
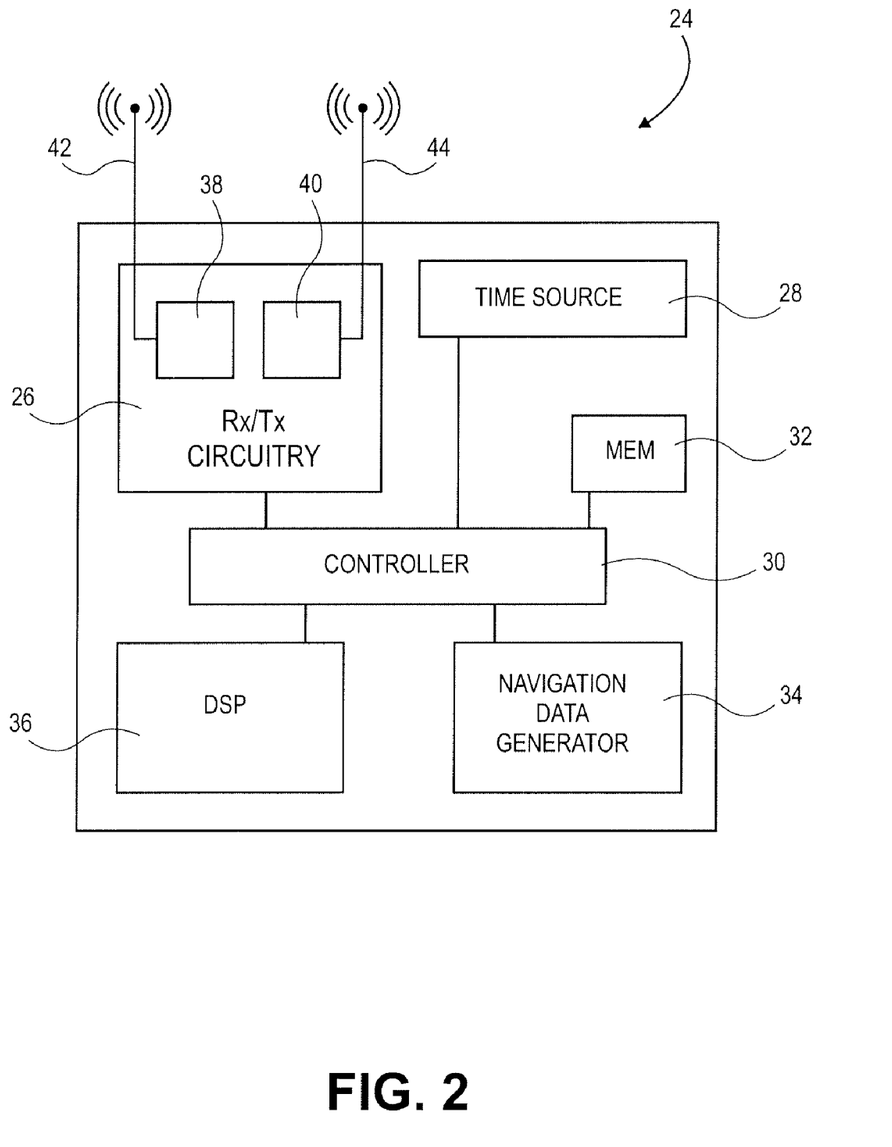
FIG. 2 is a block diagram of an exemplary receiver of the geolocation system of FIG. 1, wherein the receiver is operable to communicate with a control station via a data link with reduced data throughput.

Referring now to FIG. 2, a block diagram of an exemplary embodiment of the receiver 24 is illustrated. The illustrated receiver 24 broadly comprises receive and transmit (Rx/Tx) circuitry 26, a time source 28, a controller 30, a memory element 32, a navigation data generator 34, and a digital signal processing component 36.

The receive and transmit circuitry 26 generally enables communications between the receiver 24 and the emitter 12, and between the receiver 24 and the control station 20. More particularly, the illustrated Rx/Tx circuitry 26 is operable to receive and digitize wireless signals originating from the emitter 12, to receive and digitize wireless signals originating from the control station 20, and to generate wireless signals and communicate the wireless signals to the control station 20. The Rx/Tx circuitry 26 is in communication with the controller 30 to communicate the received and digitized signals to the controller 30 and to receive instructions from the controller 30 for generating wireless signals to be communicated to the control station 20.

The illustrated embodiment of the Rx/Tx circuitry 26 includes two wireless interfaces, a first interface 38 for receiving wireless signals from the emitter 12 and a second interface 40 for wireless communications with the control station 20, both of which are substantially conventional in nature and therefore will not be described in detail. A first antenna 42 is associated with the first interface 38 and a second antenna 44 is associated with the second interface 40. While the Rx/Tx circuitry 26 has been described herein as including two interfaces, it will be appreciated that a single interface may be used to communicate with both the emitter 12 and the control station 20.

The second interface 40 is preferably a data link interface. A data link is a serial data communications transmission path, generally between two adjacent nodes or devices and without intermediate nodes, such as intermediate switching nodes. It will be appreciated, however, that the present teachings do not limit the second interface 40 to a data link interface, and that other, equally preferred communications transmissions paths may be employed without departing from the scope of the claimed invention. A transmission path, for example, capable of employing one or more intermediate nodes may be used with the present teachings.

The time source 28 enables synchronous operation of the various components of the receiver 24. Furthermore, when each of the nodes 14,16,18 includes a similar time source, the time sources enable synchronous operation of the nodes 14,16,18 by, for example, identifying a relative time of arrival of the emitter's 12 signal to each of the nodes 14,16,18. The time source 28 is preferably a precision time source, such as, for example, a disciplined rubidium oscillator (DRO). Thus, each of the nodes 14,16,18 preferably includes a precision time source that enables the node to generate time blocks of data according to time parameters that are substantially identical to time parameters used by the other nodes to generate time blocks of data. Such parameters may include, for example, frequency and stability.

The controller 30 generally controls operation of the receiver 24. The controller 30 is preferably a digital integrated circuit and may be a general use, commercial off-the-shelf computer processor. Alternatively, the controller 30 may be a programmable logic device configured for operation with the circuit receiver 24, or may be an application specific integrated circuit (ASIC) especially manufactured for use in the receiver 24. While illustrated as a single component of the block diagram, the controller 30 may include two or more separate integrated circuits working in cooperation to control operation of the receiver 24, and may include one or more analog elements operating in concert with, or in addition to, the digital circuit or circuits. The memory element 32 stores data, instructions, or both used by the controller 30. While the memory element 32 is illustrated as a single unit separate from the controller 30, the memory element 32 may be internal to the controller 30 or may include multiple components.

The digital signal processing (DSP) component 36 includes a specialized digital microprocessor and supporting circuitry used to efficiently and rapidly perform calculations on digital signals, such as signals received from the emitter 12 and digitized by the Rx/Tx circuitry 26. For example, the DSP component 36 is operable to perform a Fourier Transform, such as the Fast Fourier Transform, or other operations in order to identify frequency components and other characteristics of a signal. Thus, the DSP component 36 may be a commercial off-the-shelf DSP card, such as a DSP card manufactured by MERCURY DEVELOPMENT™. The DSP component may be substantially software-based, wherein it includes a processor operable to execute ordered listings of instructions provided by an end user, or it may be substantially hardware-based, wherein it includes one or more programmable logic devices, application specific integrated circuits, or other circuitry operable to perform the calculations. The DSP component may include both software and hardware elements.

The navigation data generator 34 generates navigation data and communicates the data to the controller 30 in a conventional manner, wherein the controller 30 communicates the navigation data to the control station 20 along with qualified signal data, as explained below in greater detail. The navigation data may include location information and velocity information of the node 14 associated with the receiver 24, wherein velocity information includes both a speed and a direction of travel. The navigation data generator 34 may include a global positioning system receiver (not shown) or other circuitry or components for determining a current position of the generator 34.

It will be appreciated that the receiver 24 illustrated in FIG. 2 and described herein is exemplary in nature and that the present teachings contemplate variations in the disclosed receiver 24 and associated components without departing from the scope of the claimed invention. Two or more of the components of the receiver 24 described herein may be combined, for example, or the functionality of a first component may be implemented in a second component wherein the first component is eliminated. Furthermore, the list of components of the receiver 24 illustrated and discussed herein is not meant to be exhaustive.

Figure 3:
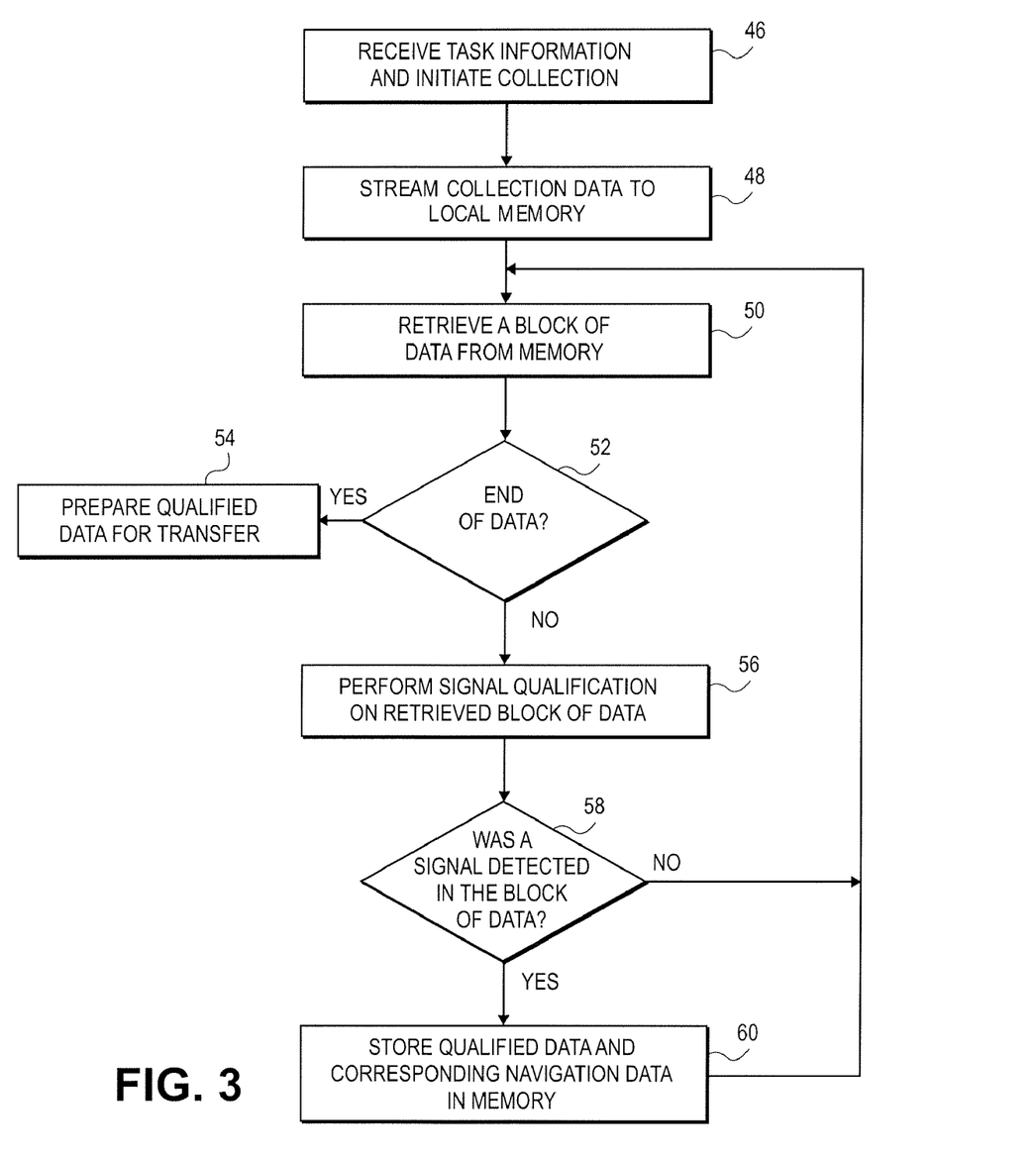
FIG. 3 is a flowchart of steps depicting exemplary operation of the system of FIG. 1, wherein a system collection node discriminates between signal data and non-signal data and communicates only the signal data to the control station.

A flowchart of steps depicting exemplary operation of the system 10 is illustrated in FIG. 3. The receiver 24 receives task information and initiates data collection, as depicted in block 46. The task information is preferably received from the control station 20, but may also be received from another source, such as, for example, from a user directly programming the node 14. The task information relates to the type of signal to be received from the emitter 12 and when collection is to occur. The task information is substantially conventional in nature, wherein exemplary task information includes frequency of the signal to be collected, collection bandwidth, collection duration, start time, end time, and sample rate. The controller 30 receives and analyzes the task information, and controls other components in response to the task information. For example, the controller 30 directs the Rx/Tx circuitry 26 to begin receiving and digitizing signals from the emitter 12 at the start time and to stop receiving and digitizing signals at the stop time.

Once the controller 30 has made hardware assignments and the Rx/Tx circuitry 26 begins receiving and digitizing signals from the emitter 12, the controller 30 receives the digitized data and streams the data to memory 32 as collection data, as depicted in block 48. Collection data includes both signal data and non-signal data. The emitter 12 may communicate signals as pulses, for example, wherein data collected between pulses does not include signal data.

The controller 30 retrieves a block of collection data from the memory element 32, as depicted in block 50. Blocks of data may be of virtually any size, such as, for example, ten kilobytes, twenty kilobytes, or thirty kilobytes, and the size may be uniform or non-uniform from one node to another. Using uniform block size across the collection nodes 14,16, 18 is advantageous, however, because it facilitates synchronizing the information communicated to the control station 20 from the collection nodes 14,16,18. The controller 30 may divide the data into blocks as it stores the data in the memory 32, or may store the data as a continuous stream and divide it into blocks upon retrieval.

Upon retrieval of a block of data from memory, the controller 30 determines whether all of the data has been retrieved, as depicted in block 52. The controller 30 may determine that it has reached the end of the data, for example, if there is no more data to retrieve or if the collection has timed out. If the controller 30 has reached the end of the data in memory 32, the controller 30 prepares qualified data, and corresponding navigation data, for transfer to the control station 20, as depicted in block 54. Qualified data includes blocks of collection data that include signal data and does not include blocks of collection data with only non-signal data. If the controller 30 determines that the end of the data has not been reached, it performs signal qualification on the retrieved block of data, as depicted in block 56.

Signal qualification involves determining whether the block of collection data includes signal data. One exemplary method of signal qualification involves analyzing an energy level of the signal. The receiver 24 may determine the energy level of the signal, for example, by estimating the signal to noise ratio of the block of data, estimating the bandwidth of the block of data, and determining whether either the signal to noise ratio or the bandwidth exceeds a predetermined threshold.

The signal to noise ratio (SNR) may be determined by detecting modulation of the carrier frequency, which may be calculated according to the following equation:

$$SNR = 10 \times \log_{10}\left(\frac{2\text{-kurtosis} + \sqrt{2\text{-kurtosis}}}{\text{kurtosis-}1}\right),$$

wherein kurtosis=($2^{nd}$ moment)/($4^{th}$ moment)$^2$, $2^{nd}$ moment=mean($2^{nd}$ moment vector$_n$), $2^{nd}$ moment vector$_n$=|signal$_n$|$^2$, $4^{th}$ moment=mean($4^{th}$ moment vector$_n$), and $4^{th}$ moment vector$_n$=($2^{nd}$ moment vector$_n$)$^2$.

In the above equations, the value of "signal$_n$" is a value of the input signal ranging from a first sample to an $N^{th}$ sample, or n={1,N}.

Figure 4:
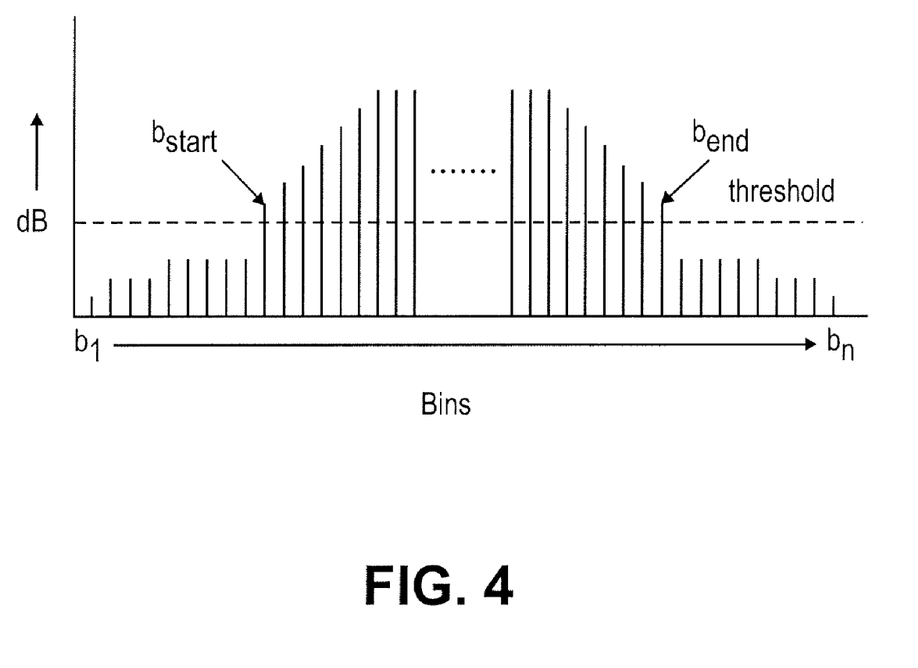
FIG. 4 depicts a frequency spectrum of a portion of collection data, wherein the spectrum is generated by the receiver of FIG. 2, and wherein a threshold value is superimposed over a group of bins such that bins that exceed the threshold value are used by the receiver to determine a bandwidth of the portion of collection data.

The bandwidth is determined by computing the bandwidth of the signal using, for example, the Fast Fourier Transform, identifying all bins that exceed a predetermined threshold, and identifying a start bin (lowest frequency) and an end bin (highest frequency) that exceed the threshold. An exemplary signal frequency spectrum is illustrated in FIG. 4, including a threshold value, start bin (b$_{start}$) and end bin (b$_{end}$). The fractional bandwidth is computed as:

fractional bandwidth=(bin$_{end}$-bin$_{start}$)/(total number of bins), and the actual bandwidth is computed as:

(fractional bandwidth)×(sampling rate).

If the signal-to-noise ratio or the bandwidth is below a predetermined threshold, the data block fails signal qualification and the controller 30 retrieves another block of collection data, as depicted in block 58 of FIG. 3. The signal to noise ratio threshold is preferably within the range of about ½ dB to about 100 dB, more preferably within the range of about 1 dB to about 70 dB, even more preferably within the range of about 3 dB to about 20 dB, and most preferably about 8 dB. The bandwidth threshold is preferably within the range of about 10 Hz to about 1,000 Hz, more preferably within the range of about 50 Hz to about 800 Hz, even more preferably within the range of about 100 Hz to about 300 Hz, and most preferably about 200 Hz. It will be understood that these ranges are exemplary in nature, and that the present teachings contemplate virtually any bandwidth threshold value and any signal-to-noise ratio threshold value necessary to preserve signal quality requirements or other parameters of a particular implementation.

The calculations discussed above may be performed by either the controller 30 or the DSP component 36. In an exemplary embodiment, however, the DSP component 36 performs most or all of the signal processing calculations, such as Fast Fourier Transforms and moment vector calculations, while the controller 30 directs the process and performs minor calculations, such as comparisons.

If the controller 30 determines that the block of data includes signal data, the controller 30 stores the block of data in the memory element 32 as qualified data along with any navigation data received from the navigation data generator 34 and corresponding to the qualified data block, as depicted in block 60.

The controller 30 may retrieve and analyze blocks of data after the collection data has all been streamed to memory 32, or may retrieve and analyze collection data concurrently with the process of streaming the data to memory 32.

Figure 5:
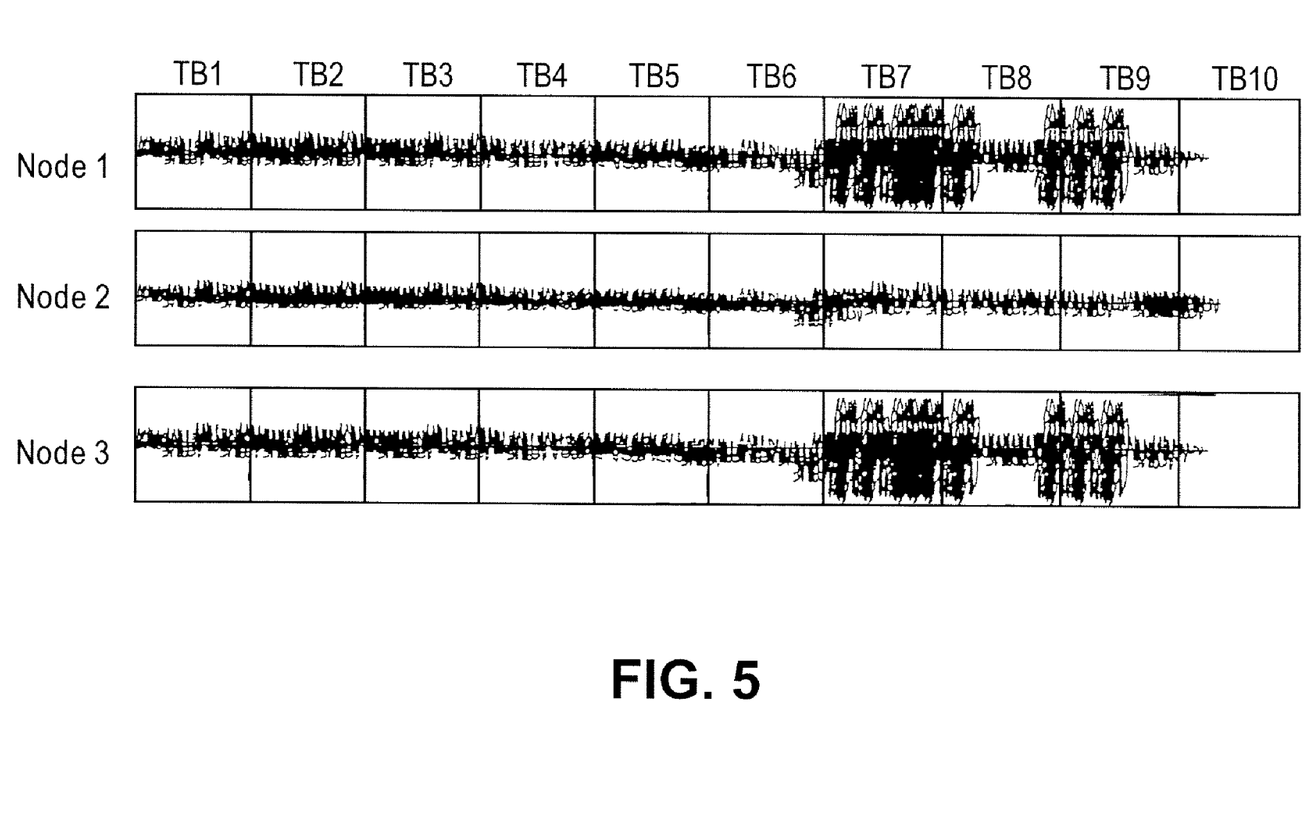
FIG. 5 represents data collected by each of three collection nodes of the geolocation system of FIG. 1, wherein the data is divided into uniform blocks, each block corresponding to a period of time and including both signal data and non-signal data.

Exemplary collection data is illustrated in FIG. 5, wherein "Node 1" corresponds to a first of the collection nodes 14,16, 18, "Node 2" corresponds to a second of the collection nodes 14,16,18, and "Node 3" corresponds to a third of the collection nodes 14,16,18. The data blocks, or "time blocks," are labeled TB1-TB10, and each corresponds to a period of time. The collection data from each of the nodes is synchronized because each node begins collecting data at the same time, as directed by the control station 20. That synchronization is preserved in the qualified data communicated to the control station 20 by each of the nodes 14,16,18 if all of the nodes use the same data block size and identify each data block included in the qualified data. Non-uniform data blocks may be used, but may complicate preserving the synchronous nature of the data. Maintaining the synchronous nature of the data is desirable, for example, to enable use of a cross ambiguity function to determine the time difference of arrival and frequency difference of arrival of the datasets.

Referring again to FIG. 5, data blocks TB7-TB9 of nodes 1 and 3 include signal data, and are therefore qualified by the respective receiver and communicated to the control station 20. Node 2 may not have collected the data because, for example, it is beyond the range of the emitter 12. The receiver 24 communicates only the six qualified data blocks, along with the corresponding navigation data, to the control station 20. Prior art systems, in contrast, would indiscriminately communicate all thirty blocks of collected data illustrated in FIG. 5 to the control station 20. Thus it can be seen that the receiver 24 substantially reduces the amount of time and resources required to communicate emitter signal data from each node 14,16,18 to the control station 20. This is advantageous, for example, because it allows the control station 20 to perform geolocation in real time.

Although the invention has been described with reference to preferred embodiments illustrated in the attached drawings, it is noted that equivalents may be employed and substitutions made herein without departing from the scope of the invention as recited in the claims. It will be appreciated, for example, that the receiver 24 may detect signal data in a block of data by estimating only the bandwidth or only the signal to noise ratio. Furthermore, it will be appreciated that various principles of the present invention are independent of the geolocation system illustrated and described herein. The functionality of the receiver 24, for example, may be used in any system or implementation where it is necessary or helpful to discriminate between signal data and non-signal data while preserving timing information.

The invention claimed is:

1. A receiver with reduced data link throughput, the receiver comprising:
   a first interface for receiving a wireless signal and for generating signal collection data, wherein the signal collection data includes signal data and non-signal data;
   a navigation data circuit for generating and storing navigation data including position and velocity data recorded at the time the first interface receives the wireless signal;
   a processor for analyzing the signal collection data to identify portions of the data that include signal data and portions of the data that include only non-signal data;
   a second interface for communicating information to an external device via a wireless data link; and
   a controller for communicating only the navigation data and the portions of the data that include signal data to the second interface for communication to the external device via the wireless data link.

2. The receiver as set forth in claim 1, wherein the processor analyzes the signal collection data by determining a signal to noise ratio and a bandwidth of each portion of the data, wherein the controller determines that a portion includes signal data only if the signal to noise ratio or the bandwidth of the portion exceeds a pre-determined threshold.

3. The receiver as set forth in claim 2, wherein the controller determines the signal to noise ratio by detecting modulation of a carrier frequency of the signal, and determines the bandwidth by applying a Fourier transform to the data.

4. The receiver as set forth in claim 3, wherein the controller determines the signal to noise ratio by determining the second and fourth moments of the signal and using the second and fourth moments to calculate a kurtosis value of the signal.

5. The receiver as set forth in claim 4, wherein the second moment is defined as mean(second moment vector$_n$), wherein second moment vector$_n$=|signal$_n$|$^2$, and wherein the fourth moment is defined as mean(fourth moment vector$_n$), wherein fourth moment vector$_n$=(second moment vector$_n$)$^2$.

6. The receiver as set forth in claim 4, wherein the controller determines the kurtosis value by dividing the second moment by the square of the fourth moment.

7. The receiver as set forth in claim 4, wherein the controller determines the signal to noise ratio (SNR) according to the equation $$SNR = 10 \times \log_{10}\left(\frac{2\text{-kurtosis} + \sqrt{2\text{-kurtosis}}}{\text{kurtosis-}1}\right).$$

8. A geolocation system with reduced data link throughput, the system comprising:
- a transmitter for transmitting a wireless signal;
- a plurality of mobile receiver platforms, wherein each platform includes—
  - a circuit for receiving the wireless signal and for generating collection data, wherein the collection data includes signal data and non-signal data and is divided into time blocks of uniform size,
  - a circuit for generating navigation data indicating a position and a velocity of the platform corresponding to the collection data,
  - a digital signal processor for determining whether each data block includes signal data by determining a signal to noise ratio and a bandwidth of each stored data block and comparing the signal to noise ratio and the bandwidth to pre-determined threshold values,
  - a wireless data link interface, and
  - a controller for communicating the collection data to the digital signal processor, and for communicating qualified data and corresponding navigation data to the data link interface, wherein qualified data includes only data blocks that contain signal data; and
- a control station for receiving the data packets communicated by each of the receiver platforms and generating location information of the transmitter based on the data packets.

9. The receiver as set forth in claim 8, wherein each mobile receiver platform further includes a precision time source for enabling each receiver platform to generate the time blocks of data according to time parameters that are substantially identical to time parameters used by the other receivers to generate time blocks of data.

10. The receiver as set forth in claim 8, wherein the digital signal processor determines the signal to noise ratio by detecting modulation of a carrier frequency, and determines the bandwidth by applying a Fourier transform to the data.

11. The receiver as set forth in claim 10, wherein the digital signal processor determines the signal to noise ratio by determining the second and fourth moments of the signal and using the second and fourth moments to calculate a kurtosis value of the signal.

12. The receiver as set forth in claim 11, wherein the second moment is defined as mean(second moment vector$_n$), wherein second moment vector$_n$=|signal$_n$|$^2$, and wherein the fourth moment is defined as mean(fourth moment vector$_n$), wherein fourth moment vector$_n$=(second moment vector$_n$)$^2$.

13. The receiver as set forth in claim 11, wherein the digital signal processor determines the kurtosis value by dividing the second moment by the square of the fourth moment.

14. The receiver as set forth in claim 11, wherein the digital signal processor determines the signal to noise ratio (SNR) according to the equation $$SNR = 10 \times \log_{10}\left(\frac{2\text{-kurtosis} + \sqrt{2\text{-kurtosis}}}{\text{kurtosis-}1}\right).$$

15. A method of data collection that reduces throughput of a data link between a receiver and a control station, the method comprising:
- receiving a wireless signal and generating signal collection data at the receiver, wherein the signal collection data includes signal data and non-signal data and is divided into data blocks;
- generating navigation data including a position and a velocity of the receiver corresponding to the collection data;
- analyzing each data block at the receiver to determine whether the data block includes signal data; and
- communicating qualified data and navigation data from the receiver to the control station via a wireless data link, wherein the qualified data includes only data blocks that include signal data.

16. The method as set forth in claim 15, wherein analyzing each data block at the receiver to determine whether the data block includes signal data involves determining a signal to noise ratio of the data and a bandwidth of the data.

17. The method as set forth in claim 16, wherein determining the signal to noise ration involves detecting modulation of a carrier frequency of the signal and determining the bandwidth involves applying a Fourier transform to the data.

18. The method as set forth in claim 17, wherein determining the signal to noise ratio includes determining the second and fourth moments of the signal and using the second and fourth moments to calculate a kurtosis value of the signal.

19. The method as set forth in claim 18, wherein the second moment is defined as mean(second moment vector$_n$), wherein second moment vector$_n$=|signal$_n$|$^2$, and wherein the fourth moment is defined as mean(fourth moment vector$_n$), wherein fourth moment vector$_n$=(second moment vector$_n$)$^2$.

20. The method as set forth in claim 18, wherein the kurtosis value is determined by dividing the second moment by the square of the fourth moment.

21. The method as set forth in claim 18, wherein the signal to noise ratio (SNR) is determined according to the equation $$SNR = 10 \times \log_{10}\left(\frac{2\text{-kurtosis} + \sqrt{2\text{-kurtosis}}}{\text{kurtosis-}1}\right).$$

* * * * *